United States Patent
Kinney et al.

(10) Patent No.: US 7,937,701 B2
(45) Date of Patent: May 3, 2011

(54) ACPI COMMUNICATION BETWEEN VIRTUAL MACHINE MONITOR AND POLICY VIRTUAL MACHINE VIA MAILBOX

(75) Inventors: Michael D. Kinney, Olympia, WA (US); Kirk D. Brannock, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1475 days.

(21) Appl. No.: 11/173,711

(22) Filed: Jun. 30, 2005

(65) Prior Publication Data

US 2007/0006227 A1 Jan. 4, 2007

(51) Int. Cl.
G06F 9/455 (2006.01)
G06F 1/00 (2006.01)

(52) U.S. Cl. .......................................... 718/1; 713/300

(58) Field of Classification Search ............... 718/1, 104, 718/106, 108; 713/201, 1, 2, 300, 340; 717/158, 717/128; 709/201, 202, 212, 224; 719/318, 719/321

See application file for complete search history.

(56) References Cited

U.S. PATENT DOCUMENTS

| | | | | |
|---|---|---|---|---|
| 5,408,617 A * | 4/1995 | Yoshida | ........................ | 719/319 |
| 5,452,462 A * | 9/1995 | Matsuura et al. | ................. | 718/1 |
| 5,822,583 A * | 10/1998 | Tabuchi | ........................ | 718/100 |
| 6,279,046 B1 * | 8/2001 | Armstrong et al. | ................ | 710/5 |
| 6,802,054 B2 * | 10/2004 | Faraj | ............................ | 717/128 |
| 6,826,701 B1 | 11/2004 | Plante | | |
| 6,892,264 B2 * | 5/2005 | Lamb | ............................ | 710/301 |
| 7,424,710 B1 * | 9/2008 | Nelson et al. | ..................... | 718/1 |
| 2002/0073063 A1 * | 6/2002 | Faraj | ................................. | 707/1 |
| 2004/0064521 A1 * | 4/2004 | Baudry et al. | ................. | 709/213 |
| 2004/0083481 A1 * | 4/2004 | Shultz et al. | .................. | 719/312 |
| 2004/0215905 A1 * | 10/2004 | Armstrong et al. | ........... | 711/156 |
| 2005/0015619 A1 * | 1/2005 | Lee | ................ | 713/201 |
| 2005/0081212 A1 * | 4/2005 | Goud et al. | .................... | 718/107 |
| 2005/0102670 A1 * | 5/2005 | Bretl et al. | ........................ | 718/1 |
| 2005/0114855 A1 * | 5/2005 | Baumberger | ..................... | 718/1 |
| 2005/0132367 A1 * | 6/2005 | Tewari et al. | ..................... | 718/1 |
| 2005/0204357 A1 * | 9/2005 | Garg et al. | ........................ | 718/1 |
| 2005/0268078 A1 * | 12/2005 | Zimmer et al. | ................... | 713/1 |
| 2006/0020940 A1 * | 1/2006 | Culter | ........................... | 718/100 |
| 2006/0021029 A1 * | 1/2006 | Brickell et al. | ................. | 726/22 |
| 2007/0067435 A1 * | 3/2007 | Landis et al. | ................. | 709/224 |

FOREIGN PATENT DOCUMENTS

EP 0908823 A1 4/1999

(Continued)

OTHER PUBLICATIONS

PCT International Search Report (dated Sep. 10, 2006), International Application No. PCT/US2006/026117—International Filing Date Jun. 29, 2006, 11 pages.

(Continued)

*Primary Examiner* — Meng-Ai An
*Assistant Examiner* — Brian Chew
(74) *Attorney, Agent, or Firm* — Sharmini N. Green

(57) ABSTRACT

A method, apparatus and system enable bi-directional communications between a virtual machine monitor ("VMM") and an Advanced Configuration & Power Interface ("ACPI") compliant guest operating system. In one embodiment, a virtual machine ("VM") may be designated as the owner of the host platform ("Policy VM"). The Policy VM may communicate with the VMM to control all configuration and power management decisions on the platform.

4 Claims, 5 Drawing Sheets

FOREIGN PATENT DOCUMENTS

| | | |
|---|---|---|
| GB | 2342735 A | 4/2000 |
| JP | 2002-318699 A | 10/2002 |
| JP | 2002-544620 A | 12/2002 |
| JP | 2004-252591 A | 9/2004 |
| WO | 2007/005924 A1 | 1/2007 |

OTHER PUBLICATIONS

PCT International Preliminary Report on Patentability (dated Jan. 9, 2008), International Application No. PCT/US2006/0256117—International Filing Date Jun. 29, 2006, 7 pages.

* cited by examiner

ACPI COMMUNICATION BETWEEN VIRTUAL MACHINE MONITOR AND POLICY VIRTUAL MACHINE VIA MAILBOX

BACKGROUND

Advanced Configuration & Power Interface ("ACPI", e.g., Revision 2.0b, Oct. 11, 2002) is an open industry standard specification for a platform configuration and power management scheme. ACPI-compliant operating systems ("OS") typically interact with platform hardware in two ways. First, the Basic Input/Output System ("BIOS") in the hardware may produce a set of memory resident tables which are parsed by the OS and its ACPI driver. These tables provide the root for software enumeration of all platform hardware that is not otherwise represented. Specifically, ACPI does not represent platform hardware that complies with parent bus standards (e.g., PC Interconnect, "PCI") because this type of hardware may be enumerated and power managed using the standards. Thus, the hardware typically declared in ACPI tables are platform hardware that cannot be enumerated and/or managed using the bus standards. In other words, the ACPI tables contain an enumeration and power management abstraction for all platform specific (i.e. not bus standard) hardware in the platform.

Since platform hardware is interdependent, there can be only one "policy owner" for managing it. In a typical computing environment, an OS manages the platform resources In virtualized environments, however, multiple operating systems may have access to the resources on the platform. Virtualization technology enables a single host computer running a virtual machine monitor ("VMM") to present multiple abstractions and/or views of the host, such that the underlying hardware of the host appears as one or more independently operating virtual machines ("VMs"). Each VM may function as a self-contained platform, running its own OS and/or a software application(s). The VMM typically manages allocation of resources on the host and performs context switching as necessary to cycle between various VMs according to a round-robin or other predetermined scheme. The VMM is therefore responsible for interacting with ACPI and to avoiding resource conflicts.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for bi-directional communication between a VMM and an ACPI-compliant guest operating system (OS). Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

There is no current scheme by which varying ACPI events from different VMs on the host (e.g., different ACPI enable/disable operations, S-state transitions, C-state transitions, P-state transitions, T-state transitions, and interrupt routing changes) may be resolved in the final scenario described above, i.e., systems that do not include a host OS, such as a hypervisor. Thus, for example, if a first ACPI event is generated by a first VM and a different ACPI event is generated by a second VM on the same host, if a conflict arises between these events (e.g., each requires a different operation on the host), there is no current methodology by which these events may be resolved.

Embodiments of the present invention include a method, apparatus and system for bi-directional communication between a VMM and an ACPI-compliant guest OS. It will be appreciated by those of ordinary skill in the art that if an alternative scheme to ACPI is implemented, the guest OS will accordingly be compliant with the alternative scheme. Therefore, for the purposes of this specification, any reference to "OS" herein means an operating system compliant with the power configuration and management scheme implemented on the platform. Similarly, any reference to ACPI and/or an ACPI subsystem herein shall comprise any power configuration and management scheme, including, but not limited to, ACPI.

Figure 1:
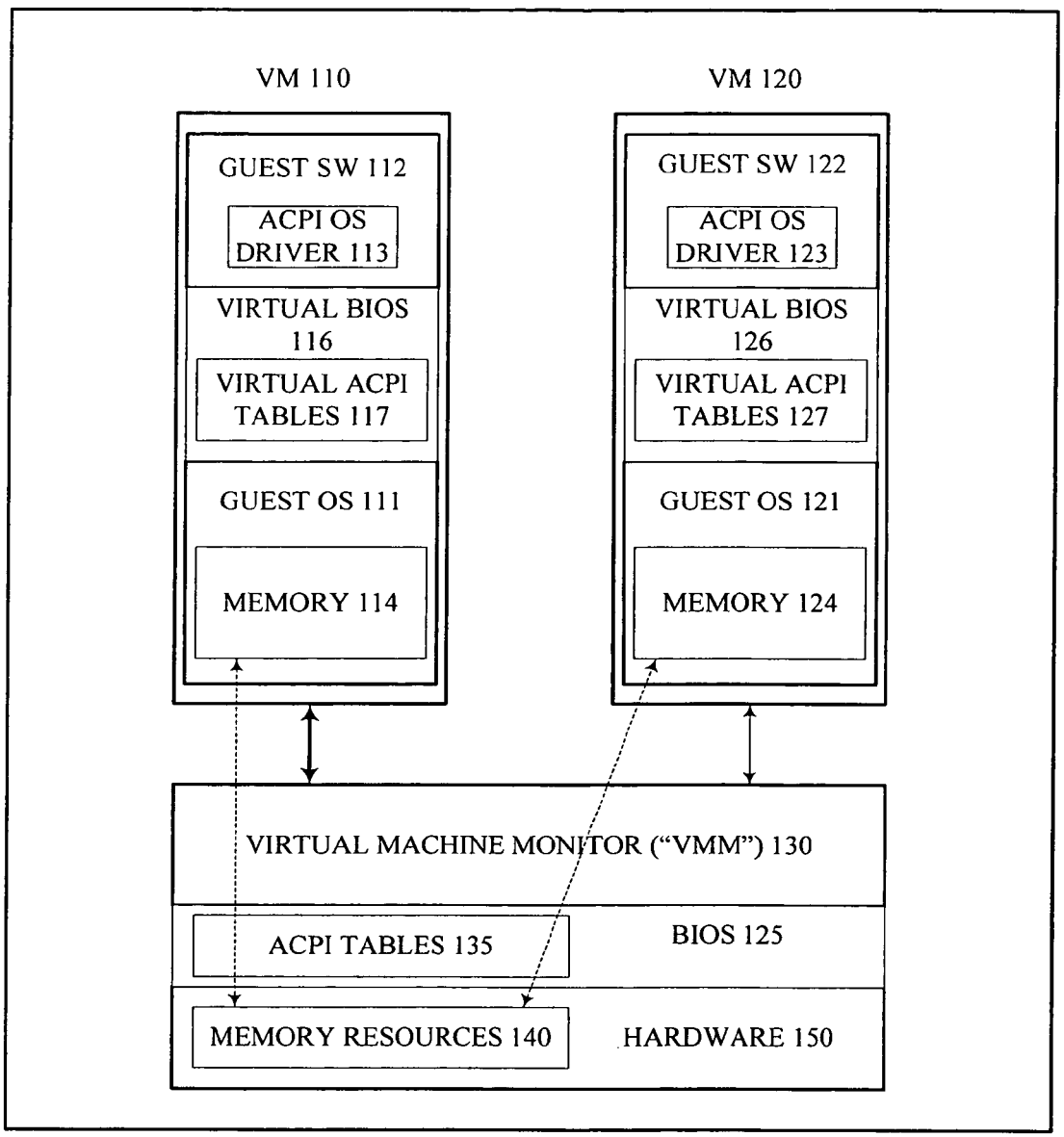
FIG. 1 illustrates an example of a typical virtual machine host.

In order to facilitate understanding of embodiments of the invention, FIG. 1 illustrates an example of a typical virtual machine host platform ("Host 100"). As previously described, a virtual-machine monitor ("VMM 130") typically runs on the host platform and presents an abstraction(s) and/or view(s) of the platform (also referred to as "virtual machines" or "VMs") to other software. Although only two VM partitions are illustrated ("VM 110" and "VM 120", hereafter referred to collectively as "VMs"), these VMs are merely illustrative and additional virtual machines may be added to the host. VMM 130 may be implemented in software (e.g., as a standalone program and/or a component of a host operating system), hardware, firmware and/or any combination thereof.

VM 110 and VM 120 may function as self-contained platforms respectively, running their own "guest operating systems" (i.e., operating systems hosted by VMM 130, illustrated as "Guest OS 111" and "Guest OS 121" and hereafter referred to collectively as "Guest OS") and other software (illustrated as "Guest Software 112" and "Guest Software 122" and hereafter referred to collectively as "Guest Software"). Each Guest OS and/or Guest Software operates as if it were running on a dedicated computer rather than a virtual machine. That is, each Guest OS and/or Guest Software may expect to control various events and have access to hardware resources on Host 100. As previously described, however, in reality, VMM 130 has ultimate control over the events and hardware resources and allocates resources to the VMs according to its own policies.

Each VM in FIG. 1 typically also includes a virtual ACPI driver ("ACPI OS Driver 113" and "ACPI OS Driver 123") within Guest Software to perform platform management. ACPI drivers are well known to those of ordinary skill in the art and further description thereof is omitted herein. These ACPI drivers may interact with the Virtual ACPI Tables 117 and 127 (typically produced by VMM 130) in Virtual BIOS 116 and 126 respectively, to perform configuration and power management for each VM. As previously described, however, there is no current scheme by which varying ACPI events from different VMs on the host may be resolved in the absence of a host operating system. Although the following description assumes the use of the ACPI protocol, other configuration protocols may also be utilized without departing from the spirit of embodiments of the present invention. Various memory resources may also be available to Host 100 (illustrated collectively in FIG. 1 as Memory Resources 140, contained within Hardware 150). Portions of Memory Resources 140 may be allocated to each VM on Host 100 (illustrated as Memory 114 and Memory 124 within VMs 110 and 120 respectively). This allocation of the memory resources to the various VMs is typically managed by VMM 130.

As previously described, the VMM in a virtualized host is typically responsible for managing allocation of resources on the host. The VMM is therefore responsible for avoiding any contention for resources that would otherwise occur if each OS on the virtualized host were allowed to see the host platform and the host ACPI tables. If the VMM is a "hosted" VMM, i.e., a VMM that is started from and under the control of a host operating system, the platform hardware and policy ownership is typically retained by the host OS. The VMM then sits on top of the host OS, creates VMs using a variety of software techniques, and creates a completely imaginary platform in software in which a virtualized OS can run. This means the VMM creates all the virtual platform hardware, and virtual ACPI tables, which may or may not have any relationship to the actual platform at all.

If the VMM is unhosted (e.g., a "hypervisor"), the VMM may handle resource contention in one of two ways. First, the VMM itself may own the platform policy and ACPI, and provide nearly completely virtual platforms to all guests. This scheme is very similar to the hosted model, but without a host OS. Instead, the hypervisor bears the substantial burden of dealing with the nuances of ACPI and power management for the platform.

Alternatively, according to an embodiment of the present invention, the VMM may designate one of the VMs on Host 100 as the "policy owner" of the platform (hereafter referred to as "policy VM"). The policy VM may dictate the platform power policies of Host 100 and "see" most of the platform hardware and "real" ACPI tables. Subsequent guests may be special purpose guests without a need for platform control, and/or may have simplified virtual platform hardware presented to them by the hypervisor. These guests maybe deemed "subordinate guests". The VMM may additionally produce virtualized ACPI tables for these subordinate guests if the Guest Software in these guests is ACPI aware.

An embodiment of the present invention enables bi-directional communication between the VMM and the ACPI tables. More specifically, embodiments of the present invention enable the ACPI subsystem in the policy VM to communicate with the VMM by augmenting the ACPI tables and ACPI methods which are provided as part of the system firmware. These augmented ACPI methods interact with a designated memory operation region and a virtualized hardware device to inform the VMM of ACPI related information and events. The designated memory operation region is used as a "mailbox" and a virtual hardware device is used to notify the VMM that the memory operation region mailbox contains new information. In one embodiment, the virtual hardware device is a single unused 8-bit input/output (I/O) port. In various embodiments, the I/O port used for the virtualized hardware device may be an I/O port that is not decoded by the chipset, may never be allocated to a device, and is guaranteed to not have any side effects on the platform. This allows the same ACPI tables and methods to be used in both the presence and absence of a VMM. Alternative virtual hardware devices may also be utilized without departing from the spirit of embodiments of the present invention.

Conversely, the "mailbox" may also be used by the VMM to notify and/or communicate with the policy VM to affect platform management decisions. To facilitate this scheme, the ACPI driver in the policy VM may be "enlightened" with the use of System Control Interrupts ("SCI") and General Purpose Events ("GPE"). GPEs are well known to those of ordinary skill in the art and will not be described in further detail herein in order not to unnecessarily obscure embodiments of the present invention. GPEs may be used to determine the cause of SCIs, which are ACPI-defined interrupts produced by ACPI hardware (e.g., the ACPI hardware on Host 100's chipset) to communicate with the ACPI subsystem in the policy VM's OS.

Thus, according to an embodiment of the present invention, the VMM may add ACPI method information to the mailbox and then inject an SCI into the policy VM. Upon receiving the SCI, the ACPI driver in policy VM's OS may cause an interrupt service routine ("ISR") and/or a deferred procedure call ("DPC") to be executed in the ACPI subsystem of the policy VM. The policy VM may then query the GPE status register and the query may be intercepted by the VMM. The VMM may virtualize the GPE register blocks to produce a virtual GPE status register and thereafter trap these ISR and/or DPC queries from the ACPI driver in the policy VM's OS. The VMM may then edit the result of the queries and return the virtual GPE status as "active". Thereafter, policy VM's ACPI driver may dispatch drivers to handle the SCI based on the GPE that was active.

Figure 2A:
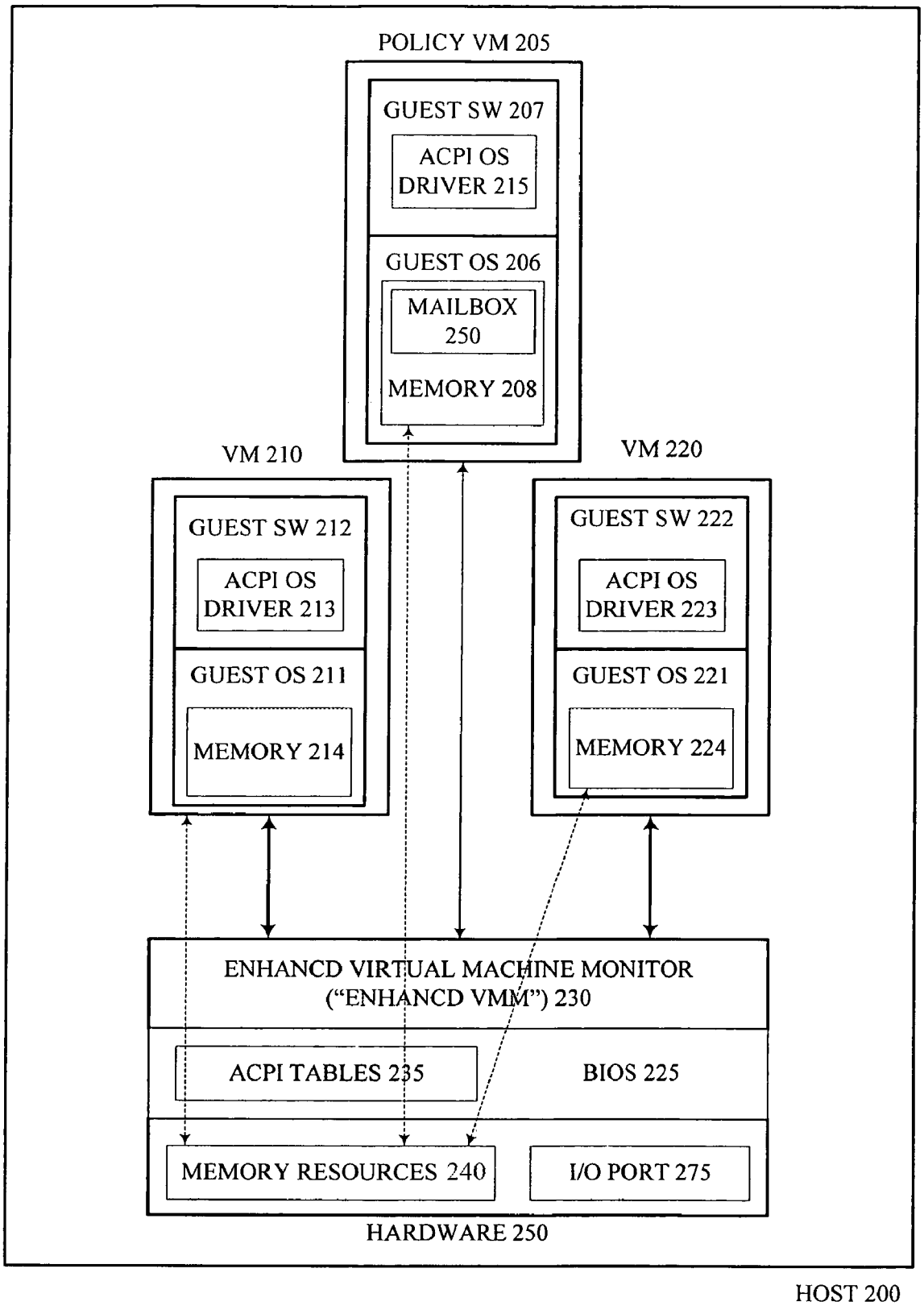
FIGS. 2A-B illustrate various embodiments of the present invention in further detail.
Figure 2B:
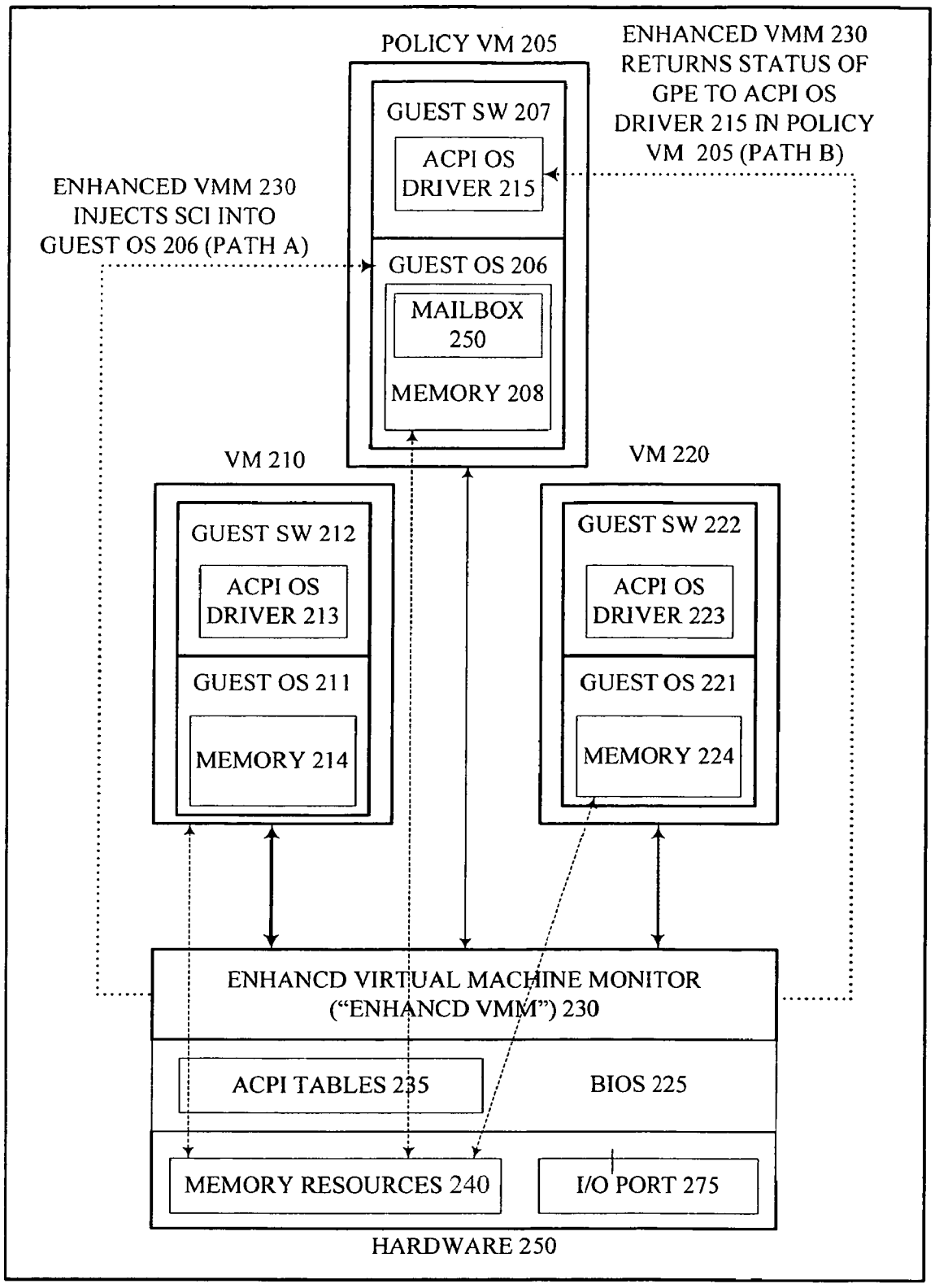

FIGS. 2A-B illustrate various embodiments of the present invention in further detail. In order not to unnecessarily obscure embodiments of the invention, certain elements (e.g., the virtual BIOS and virtual ACPI tables) are not illustrated therein. It will be readily apparent to those of ordinary skill in the art, however, that various other components may exist on and/or coupled to Host 200 without departing from the spirit of embodiments of the present invention. Additionally, although Host 200 as illustrated as including three VMs, it will be apparent to those of ordinary skill in the art that more or less VMs may be implemented without departing from the spirit of embodiments of the present invention. One of the VMs may be designated as the policy VM (illustrated as "Policy VM 205", the other VMs designated as "VM 210" and "VM 220").

FIG. 2A illustrates an embodiment of the invention wherein Policy VM 205 dictates the platform power policies Host 200, without any input from VM 210 and/or VM 220. According to this embodiment, the firmware on the host (illustrated as BIOS 225) may designate a memory operation area ("Mailbox 250") within the portion of Memory Resources 240 allocated to Policy VM 205 (illustrated as "Memory 208"). In one embodiment, Mailbox 250 may be found on a 4 KB boundary and be a multiple of 4 KB in length. In alternate embodiments, other boundries may be utilized without departing from the spirit of embodiments of the present invention.

When the ACPI subsystem in the guest OS of Policy VM 205 (illustrated as "ACPI OS Driver 215" within "Guest OS 206", collectively referred to as "Guest Software 207") executes a method, that method places information in Mailbox 250 and enables Enhanced VMM 230 to access to the virtual ACPI hardware device (illustrated as "I/O Port 275"). It will be readily apparent to those of ordinary skill in the art that the term "ACPI OS Drivers" as used herein may encompass any type of ACPI (or comparable) subsystem. Thus, for example, in operating systems where the concept of individual drivers may not exist, an ACPI (or comparable) subsystem may simply comprise part of the operating system without being a separate component. Thus, any reference herein to an "ACPI OS Driver" shall be understood to include any and all such ACPI (or comparable) subsystems. It will also be readily apparent to those of ordinary skill in the art that Enhanced VMM 230 may comprise enhancements made to an existing VMM and/or to other elements that may work in conjunction with an existing VMM. Enhanced VMM 230 may therefore be implemented in software (e.g., as a standalone program and/or a component of a host operating system), hardware, firmware and/or any combination thereof.

Upon access to IO Port 275, Enhanced VMM 230 may parse the information in Mailbox 250. An embodiment of the present invention thus enables Enhanced VMM 230 to exchange information with Policy VM 205 if Policy VM 200 includes an ACPI-compliant Guest OS (e.g., Guest OS 206). Enhanced VMM 230 may thereafter propagate this information to other VMs on Host 100 to enable the other VMs to take appropriate action, if necessary, based on the policy decisions implemented by Policy VM 205. In this manner, according to one embodiment of the present invention, Policy VM 205 may dictate the platform configuration and power management details on Host 100, thus avoiding conflicting events from different VMs.

In other embodiments, as illustrated in FIG. 2B, Enhanced VMM 230 may communicate the needs of other VMs on Host 100 to Policy VM 205. Policy VM 205 may therefore take into account the needs of other VMs on Host 100 prior to making policy decisions for the platform. In other words, instead of Policy VM 205 unilaterally making the decisions for the platform, in this embodiment, the other VMs on Host 200 may have an opportunity (via Enhanced VMM 230) to influence the decisions. Policy VM 205 may evaluate requirements of the other VMs on Host 100 and take these requirements into account when making platforms decisions. Thus, although Policy VM 205 remains in control of the decision making for the platform, it enables more informed policy making that may better suit all the VMs on Host 200.

According to this embodiment, BIOS 225 may still designate a memory Mailbox 250 within Memory Resources 240. When ACPI OS Driver 215 executes a method, that method places information in Mailbox 250 and enables Enhanced VMM 230 to access IO Port 275. According to this embodiment, however, ACPI OS Driver 215 may also be "enlightened" to such that Enhanced VMM 230 may utilize SCIs and GPEs to coordinate the power management and configuration on Host 200. As previously described, Enhanced VMM 230 may inject an SCI into Guest OS 206 (illustrated in FIG. 2B as "Path A"). Policy VM 200 may receive the SCI and cause an ISR and/or a DPC to be executed in the ACPI subsystem of VM 110, i.e., ACPI OS Driver 215. The ISR and/or DPC may query the GPE status register and the query may be intercepted by Enhanced VMM 230. Enhanced VMM 230 may produce a virtual GPE status register and thereafter trap these ISR and/or DPC queries from ACPI OS Driver 215. Enhanced VMM 230 may then edit the result of the queries and return the virtual GPE status as "active" (illustrated in FIG. 2B as "Path B"). Thereafter, ACPI OS Driver 215 may dispatch enlightened drivers to handle the SCI based on the GPE that was active. In one embodiment, ACPI OS Driver 215 may hook the virtual GPE, so the device driver may execute when the SCI is injected.

In on embodiment, Enhanced VMM 230 may allow most of the hardware devices on Host 200 to be directly mapped into Guest OS 211 on Policy VM 205. In this embodiment, Enhanced VMM 230 may be simplified by allowing Guest OS 211 to perform all of the ACPI platform configuration and power management operations. Enhanced VMM 230 must, however, be notified for several types of ACPI events in order to perform proper platform management. These include S-state, C-state, P-state, and T-state transitions. Some of this information is available from the static ACPI tables, but other information may only available through the execution of an ACPI method through an AML interpreter in Guest OS 211. In this scenario, Guest OS 211 may own the platform policy for configuration and power management and Enhanced VMM 230 and Guest OS 211 and Guest OS 221 may be required to honor those policy decisions.

In an embodiment, Enhanced VMM 230 may also be designed to produce virtual firmware and virtualized platform components. In this embodiment, assuming Guest OS 206 is ACPI-compliant, Enhanced VMM 230 may also produce virtualized ACPI tables and methods. Enhanced VMM 230 may augment these ACPI tables and methods according to the various embodiments described above. According to this embodiment, Enhanced VMM 230 may have visibility into platform configuration and power management events and the information may be used to optimize the hardware resources and CPU cycles provided to each guest VM. Thus, for example, if Enhanced VMM 230 detects an S3, S4, or S5 transition from VM 210, then Enhanced VMM 230's scheduling mechanism may stop allocating CPU cycles to VM 210 and may instead assign the CPU memory and other hardware resources to other VMs on Host 200 (e.g., Policy VM 205 and VM 220). Enhanced VMM 230 may also use knowledge of Cx, Px, and Tx state transitions in each VM to adjust the number of CPUs and CPU cycles assigned to the VMs In this way, Enhanced VMM 230 may maintain a global view on the state of all the Guest OSes within the VMs on Host 200, thereby allowing Enhanced VMM 230 to make optimal platform configuration and power management decisions.

Figure 3:
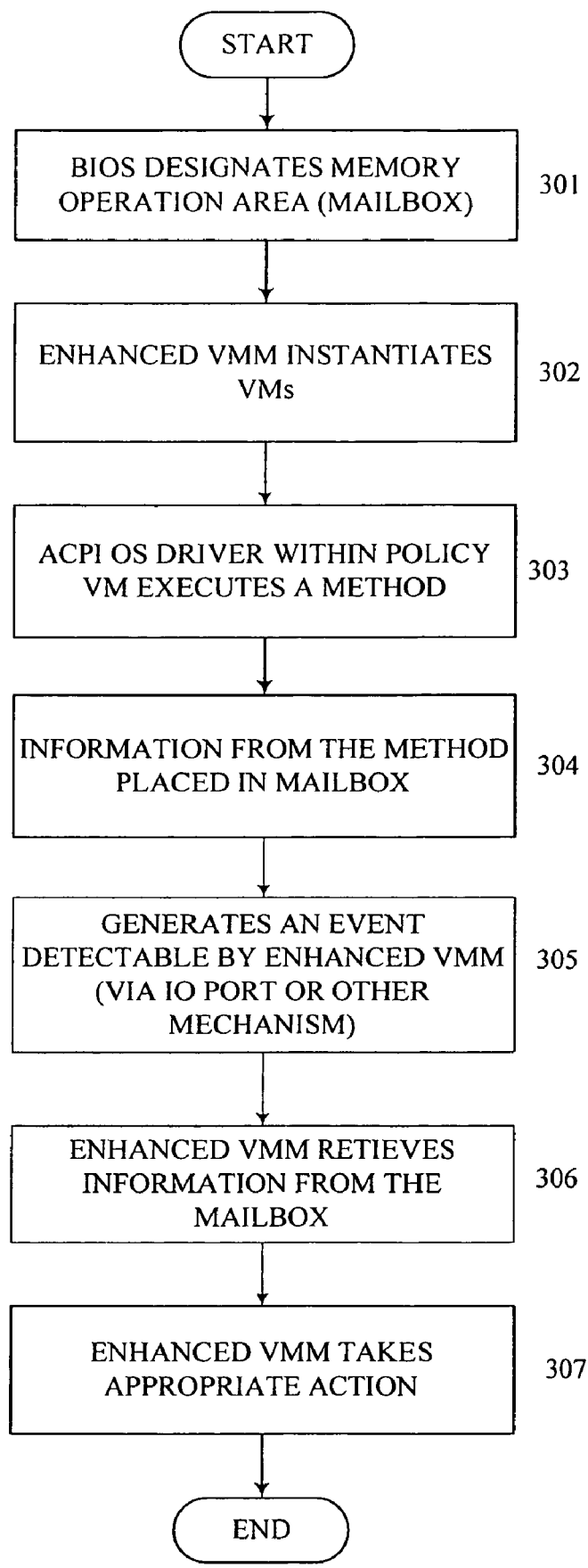
FIG. 3 is a flowchart illustrating an embodiment of the present invention.

FIG. 3 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 301, when Host 200 starts up, BIOS 225 may designate a memory operation area ("Mailbox 250") within Policy VM 205's memory. Thereafter, in 302, Enhanced VMM 230 may instantiate various VMs on Host 200, including Policy VM 205. Policy VM 205 may include ACPI OS Driver 215 within Guest OS 206. In 303, ACPI OS Driver 215 may execute a method and in 304, the information from the method may be placed in Mailbox 250. In 305, an event may be generated (via an IO port or other such mechanism). Thereafter, in 306, enhanced VMM 230 may retrieve information from Mailbox 250 and take appropriate action in 307.

Figure 4:
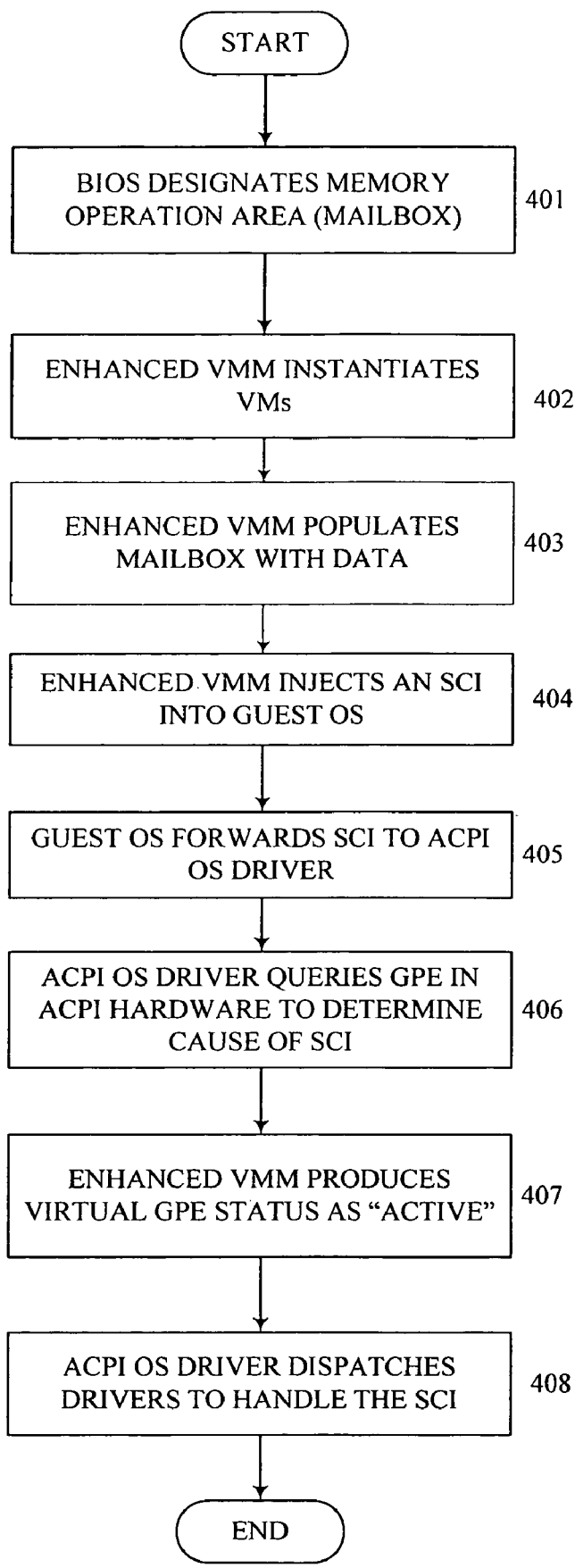
FIG. 4 is a flow chart illustrating an embodiment of the present invention.

FIG. 4 is a flow chart illustrating an embodiment of the present invention. Again, although the following operations may be described as a sequential process, many of the operations may in fact be performed in parallel and/or concurrently. In addition, the order of the operations may be re-arranged without departing from the spirit of embodiments of the invention. As before, in 401, when Host 200 starts up, BIOS 225 may designate a memory operation area ("Mailbox 250") within Policy VM 205's memory. Thereafter, in 402, Enhanced VMM 230 may instantiate various VMs on Host 200, including Policy VM 205. Policy VM 205 may include ACPI OS Driver 215 within Guest OS 206. In 403, Enhanced VMM 230 may populate Mailbox 250 with data and in 404, Enhanced VMM 230 may inject an SCI into Guest OS 206. In 405, Guest OS 206 may forward the SCI to ACPI OS Driver 215, and in 406, ACPI OS Driver 215 may query the GPE in the ACPI hardware to determine the cause of the SCI. Enhanced VMM 230 may produce a virtual GPE status register for the virtual GPE in 407 and respond to these queries by returning the virtual GPE status as "active". In 408, ACPI OS Driver 215 may dispatch drivers to handle the SCI based on the GPE that was active.

The hosts according to embodiments of the present invention may be implemented on a variety of computing devices. According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium includes any mechanism that stores and/or transmits information in any form accessible by a computing device, the machine-accessible medium including but not limited to, recordable/non-recordable media (such as read-only memory (ROM), random-access memory (RAM), magnetic disk storage media, optical storage media and flash memory devices), as well as electrical, optical, acoustical or other form of propagated signals (such as carrier waves, infrared signals and digital signals).

According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for bi-directional communication between a policy virtual machine (VM) and a Virtual Machine Manager (VMM) on a VM host comprising:
    designating one of a plurality of VMs on the VM host as the policy VM, the policy VM dictating policies of the VM host and having access to the VM host's hardware and the VM host's device configuration and power management subsystem tables;
    allocating a memory region to the policy VM;
    designating a portion of the memory region as a mailbox accessible by the policy VM and the VMM;
    enabling the policy VM to place information in the mailbox from a first method executed by the policy VM's advanced configuration and power interface (ACPI) subsystem to produce an event that is detectable by the VMM;
    enhancing the VMM to virtualize ACPI General Purpose Event (GPE) register blocks;
    enabling the VMM to communicate with the policy VM by inserting in the mailbox a second method for execution by the policy VM's ACPI subsystems; and the
    enabling the VMM to further insert an interrupt into the policy VM, the VMM injecting a System Control Interrupt (SCI) into a guest operating system (OS) in the policy VM, the guest OS forwarding the SCI to the ACPI subsystem to determine a cause of the GPE by examining a GPE register block, the VMM producing a virtual GPE register block with a status register having an active status, the ACPI subsystem examining the virtual GPE register block with the status register having the active status, and the ACPI subsystem invoking an ACPI control method to handle the SCI based on the GPE register block with the status register having the active status.

2. An article comprising a machine-accessible medium having stored thereon instructions that, when executed by a machine, cause the machine to:
    designate one of a plurality of VMs on a VM host as a policy VM, the policy VM dictating policies of the VM host and having access to the VM host's hardware and the VM host's device configuration and power management subsystem tables;
    enhance a Virtual Machine Manager (VMM) to recognize advanced configuration and power interface (ACPI) General Purpose Events (GPE);
    allocate a memory region to the policy VM;
designate a portion of the memory region as a mailbox accessible by the policy VM and a the VMM;
    enable the policy VM to place information in the mailbox from a first method executed by the policy VM's ACPI subsystem to produce an event that is detectable by the VMM; and
    enable the VMM to communicate with the policy VM by inserting in the mailbox a second method for execution by the policy VM's ACPI subsystem; and the
    enable the VMM to further insert an interrupt into the policy VM, the VMM to inject a System Control Interrupt (SCI) into a guest operating system (OS) in the policy VM, the guest OS to forward the SCI to the ACPI subsystem to determine a cause of the GPE by examining a GPE register block, the VMM to produce a virtual GPE register block with a status register having an active status, the ACPI subsystem to examine virtual GPE register block with the status register having the active status, and the ACPI subsystem to invoke an ACPI control method to handle the SCI based on the GPE register block with the status register having the active status.

3. A virtual machine VM host, comprising:
    an enhanced virtual machine manager (VMM) capable of virtualizing advanced configuration and power interface (ACPI) General Purpose Event (GPE) register blocks;
    a memory coupled to the VMM;
    a policy VM dictating policies of the VM host, the policy VM coupled to the VMM and the memory, a portion of the memory allocated to the policy VM;

a subsystem coupled to the VMM, the memory and the policy VM, the ACPI subsystem capable of executing a first method to generate information;

a mailbox designated within the portion of the memory allocated in the policy VM, the policy VM capable of placing the information generated by the first method into the mailbox to produce an event that is detectable by the VMM, the VMM additionally capable of communicating with the policy VM by inserting in the mailbox a second method for execution by the policy VM's ACPI subsystems; and the VMM additionally capable of inserting an interrupt into the policy VM; and a guest operating system (OS) in the policy VM, the VMM capable of injecting a System Control Interrupt (SCI) into the guest OS, the guest OS forwarding the SCI to the ACPI subsystem to determine a cause of the GPE by examining a GPE register block, the VMM producing a virtual GPE register block with a status register having an active status; the ACPI subsystem examining the virtual GPE register block with the status register having the active status and the ACPI subsystem invoking an ACPI control method to handle the SCI based on the GPE register block with the status register having the active status.

4. The VM host according to claim 3 wherein the VMM is further capable of processing and disseminating the information in the mailbox to other VMs on the VM host.

* * * * *